United States Patent [19]
Johansson

[11] 4,401,322
[45] Aug. 30, 1983

[54] DEVICE IN SAFETY BELTS

[76] Inventor: Eje H. K. Johansson, Backgardsgatan 32, 440 20 Vårgårda, Sweden

[21] Appl. No.: 244,025

[22] Filed: Mar. 16, 1981

[51] Int. Cl.³ .................................................. B60R 21/10
[52] U.S. Cl. .................................. 280/808; 297/483; 280/803
[58] Field of Search ............... 280/802, 803, 801, 805, 280/806, 808; 297/468, 469, 472, 479, 483

[56] References Cited
U.S. PATENT DOCUMENTS

| | | | |
|---|---|---|---|
| 4,191,400 | 3/1980 | Smith | 280/808 |
| 4,262,932 | 4/1981 | Motonami et al. | 280/802 |
| 4,264,089 | 4/1981 | Maekawa et al. | 280/808 |
| 4,310,177 | 1/1982 | Rogers, Jr. et al. | 280/808 |
| 4,315,140 | 2/1982 | Nakazato | 280/802 |
| 4,315,639 | 2/1982 | Booth et al. | 280/803 |
| 4,324,418 | 4/1982 | Stephenson | 280/808 |

*Primary Examiner*—Richard A. Bertsch

[57] ABSTRACT

The invention relates to a device in safety belts of the three-point type of passive and possibly active design, which safety belt is mounted in connection to a vehicle seat (110; 210) for the purpose of holding a user occupying said seat and comprises for one thing a lower portion (101; 201; 301; 401) intended to extend over the hip portions of the user and for another thing an upper portion (102; 202; 302; 402) intended to extend in diagonal direction across the chest of the user from one hip portion to one shoulder portion, the lower portion (101; 201; 301; 401) and the upper portion (102; 202; 302; 402) from one side of the lower portion of the vehicle seat in divergent fashion extending to a lower and an upper point of support respectively (105; 205; 305; 405 and 104; 204; 304; 404 respectively) of a vehicle door (113; 213) located on the other side of the vehicle seat, and moreover comprises a return pulling means (107; 207; 307; 407), which is arranged for the return pull of at least one of the portions of the belt in order to stretch said belt.

It is an object of the invention to provide a device in passive safety belts of the three-point type, and possibly also in safety belts of active function, which makes possible a considerably improved comfort for a user of the safety belt in connection with getting in and getting out of the vehicle.

Said object is obtained by a device provided with a lifting means (120; 220; 320; 420) serving the purpose by actuation in dependence of the opening-up of the vehicle door (113; 213) (condition B) to lift up said lower portion (101; 201; 301; 401).

9 Claims, 11 Drawing Figures

DEVICE IN SAFETY BELTS

The present invention relates to safety belts for use in vehicles and more particularly to a device in a safety belt of the three-point type preferably of a passive function, but possibly also of an active function, which device is arranged to make it more comfortable to get in and get out of the vehicle, in which the safety belt is utilized.

Safety belts of the three-point type are already known and such belts of an active design, i.e. where the user actively co-operates in the fastening of the safety belt, are of common occurrence.

A three-point safety belt exhibits three points of support, viz. a first supporting point located at one side of the seat of the vehicle, to which the safety belt belongs, and a second and a third point of support arranged on the other side of the vehicle seat, said last mentioned two supporting points being positioned on different levels one above the other. An upper belt portion extends from the first point of support to the other upper point of support and is intended to extend from one hip of the user in diagonal direction across the chest and over a shoulder portion of the user. A lower belt portion extends from the first point of support to the third low point of support and is intended to extend over the hips of the user. Both portions are usually at the first point of support connected, so that they form one piece, at which point they in the functioning position under some friction run through an opening of a fitting, whereby the two belt portions can be longitudinally adjusted in between them. The fitting usually comprises an element, which is coupled to the belt and can be manually released from an element fastened to the vehicle. An additional possibility of longitudinal adjustment of the belt is often provided at the second or third point of support. This possibility of adjustment is usually realized by means of a device for carrying out a return pull, preferably in the form of a wind-up reel arranged to cooperate with the belt in order to keep it constantly stretched. The device for the return pull functions as a locking means and is arranged to impede the belt from being pulled out, when the vehicle is subjected to momentaneous great changes of speed, so that the belt can retain the user in place on the vehicle seat.

Safety belts of the three-point type of the passive design, i.e. belts designed in such a manner that they are strapped on the user without the same taking any active steps, have been met with an ever growing interest, the reason being that they are automatically strapped on and therefore hardly can escape being utilized.

At present the simplest design of a three-point safety belt involves the application of the first point of support to the side of the vehicle seat facing away from the vehicle door and in connection with this seat, whereas the second and the third points of support are applied to the door. The passive function of the safety belt is brought about by its being swung out or moved out from the vehicle seat, when the door is opened up, so that it is made accessible thereby, whereas it is swung towards or moved towards the vehicle seat for the re-strapping on a user occupying said seat.

As the third lower point of support has to occupy a relatively low position and be located below the upper seating surface of the seat in order to make possible that the function of the lower belt portion be fulfilled, said lower belt portion will be pulled downwards from the door side towards the seating surface of the seat or the legs of the user, when the door is opened for getting in or getting out, which may be conceived as very uncomfortable.

It is an object of the invention to provide a device in passive safety belts of the three-point type, and possibly also in safety belts of active function, which device eliminates the above mentioned inconvenience and makes possible a considerably improved comfort for a user of the safety belt in connection with getting in and getting out of the vehicle.

According to the invention this object is obtained by means of a device, which is characterized by the particular features indicated in the subsequent claims.

The invention is described in the following, reference being made to the accompanying drawings, in which.

In the following description identical or equivalent elements are indicated with the same marks of reference, but preceded by a hundredunit figure indicating to which one of the four embodiments the element in question belongs.

Figure 1:
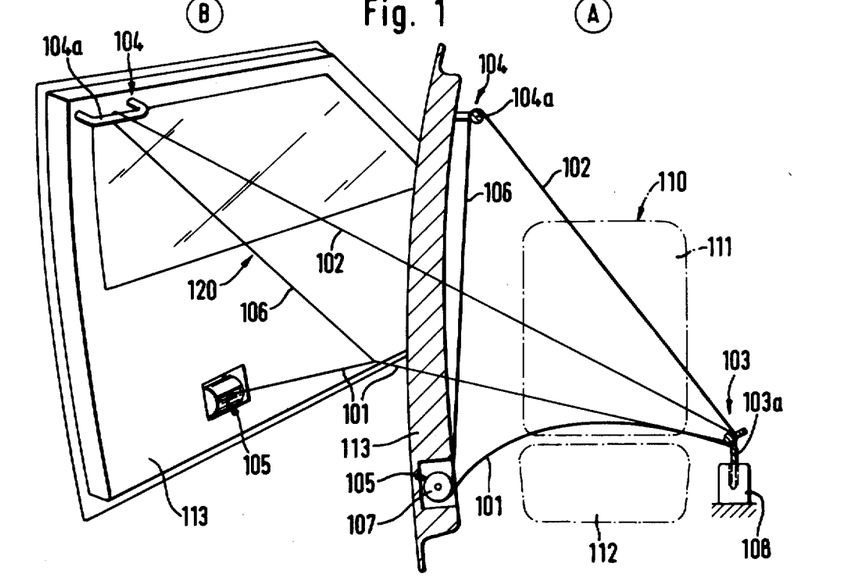
FIG. 1 is a view of a first embodiment of the device according to the invention for one thing illustrating the position, when the safety belt occupies a position, in which it is fastened round a user (the functioning position), and for another thing showing the position, which the safety belt occupies, when a user shall get in or get out of the vehicle.

A first embodiment of the invention is shown in FIG. 1, in which a simplified version of a passive three-point belt is shown with continuous lines in two conditions, for one thing a functioning condition A, wherein it is fastened round a user, and for another thing a condition B, in which it is shown in the position, in which a user shall get in or get out of the vehicle, the vehicle door then being open. The safety belt is mounted on a vehicle seat 110 with the back 111 and the seating surface 112 and on a door 113. FIG. 1 is a cross-sectional partial view through a vehicle, as seen from the rear, the section being laid behind the vehicle seat, which is shown with dashed and dotted lines.

As is evident from FIG. 1, an upper belt portion 102 extends from a first point of support 103 to a second point of support 104 on the door 113. A lower belt portion 101, which is a direct continuation of the upper belt portion 102, extends from the first point of support 103 to a third lower point of support 105 on the door. The upper belt portion 102 is via the second upper point of support 104, designed as a deflecting shackle 104a, prolonged by means of an additional portion 106, which in the condition A extends along the door 113 to the third lower point of support 105, in which together with the lower portion 101 in a juxtapositioned condition it is pulled in by means of a means for carrying out a return pull, which preferably comprises a wind-up reel 107 schematically shown in the drawing, but it can also comprise a deflecting take-up means (not shown in the drawing) mounted on the door 113.

In the condition B it is shown that the additional portion 106 is coupled to the lower belt portion 101 between the points of support 103 and 105 of the latter one, so that it is fixed to the same, by way of example by being sewn to the lower portion 101.

As is shown in FIG. 1 and the FIGS. 2-5 the first point of support can comprise a coupling element 103a, which is detachably fastened to a fitting 108 connected with the vehicle. The coupling element 103a is provided with at least one through opening, in which the belt can run under a certain frictional resistance. However, the belt can also be mounted in a flap shutter at the point of support 103, any coupling element then not being necessary to be provided on the belt.

It is evident that when the door 113 is opened up, the additional portion 106 will serve the purpose of a lifting means 120 for the lower portion 101, so that this lower portion 101 is lifted up above the seating surface 112, so that the getting in and getting out of the vehicle is facilitated. The fastening point of the additional portion to the lower portion 101 occupies of course such a position that a suitable lifting height is obtained for the lower portion.

In this embodiment the additional portion 106 is fixed to the lower portion 101. When the vehicle door is opened up a high friction can sometimes take place between the strap of the belt and the deflection means 103a and 104a, which signifies that the fastening point between the additional portion 106 and the lower portion 101 only can be somewhat displaced in outwards direction. This results in an unsatisfactory lifting height being obtained for the lower portion 101. An additional drawback in connection with this embodiment consists in the necessity of having to open the vehicle door 113 completely or to a very great extent in order to obtain a maximum lifting height for the lower portion 101.

A second embodiment of the device according to the invention is shown in FIGS. 2-5, the safety belt being schematically shown in the above mentioned two conditions. This embodiment makes possible a greater lifting height for the lower portion, when the vehicle door is opened, and this without it being necessary to open the vehicle door to its maximum extent.

As was the case with the first embodiment according to FIG. 1, the safety belt is mounted to a vehicle seat 210 with the back 211 and a seating surface 212 and to a door 213.

Figure 2:
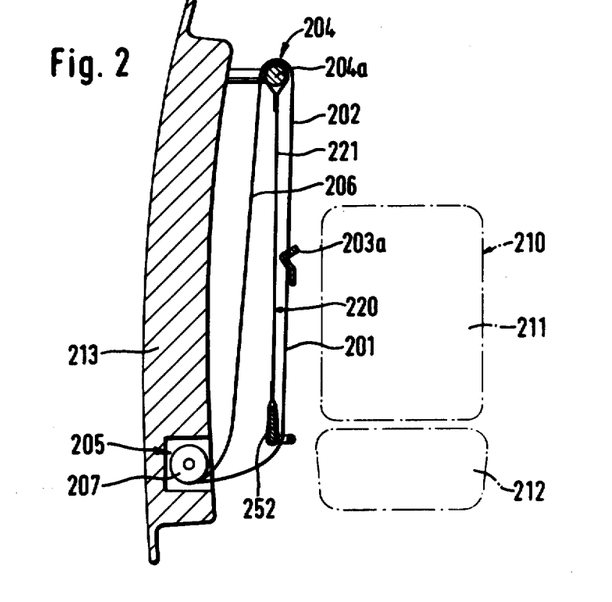
FIGS. 2-5 are schematical views of a second embodiment of the device according to the invention, FIG. 2 showing the belt suspended in not used condition, FIG. 3 showing the same in an intermediate position, when it is actively moved from the non-active position in FIG. 2 into its functioning condition, FIG. 4 being a view of the safety belt in functioning condition fastened round a user, FIG. 5 showing the safety belt in connection with the vehicle door, to which it belongs, having been opened up, FIGS. 6A and 6B schematically show cross-sectional partial views on an enlarged scale of an essential detail of the device according to the invention in the position it occupies in FIG. 4 and FIG. 5 respectively, FIGS. 7-10 schematically show two additional embodiments of the device according to the invention, FIG. 7 showing the third embodiment of the device according to the invention in the same two positions shown in FIG. 1, FIG. 8 showing the fourth embodiment of the device according to the invention in the same two conditions illustrated in FIGS. 1 and 7, and FIGS. 9 and 10 show different designs of a shackle means, which can be utilized in a lifting means operating on the lower part.

The safety belt in FIG. 2 comprises like the belt of FIG. 1 an upper portion 202 and a lower portion 201, an additional portion 206 and three points of support 203, 204, 205 respectively of the same kind as those of FIG. 1. However, there is one difference, viz. the end of the additional portion 206 not being connected with the lower portion 201, as the additional portion 206 extends from the second point of support 204 along the vehicle door 213 to the third point of support 205, where it is coupled to the means for carrying out a return pull 207, which in the example shown comprises a winding up reel 207.

Figure 3:
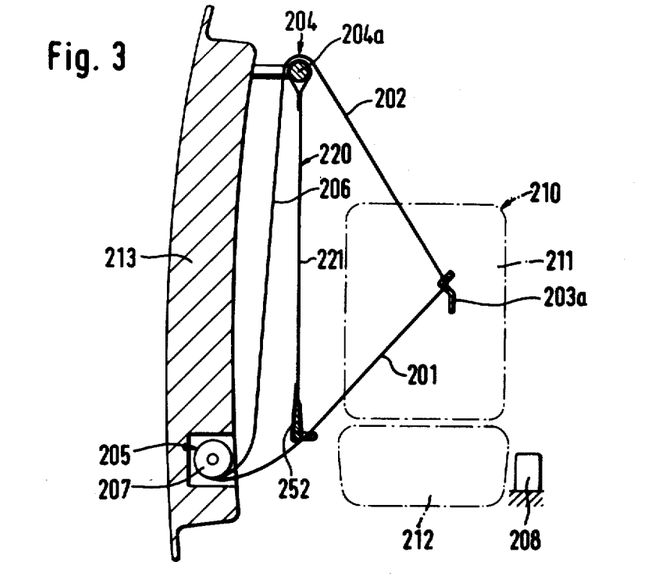
Figure 4:
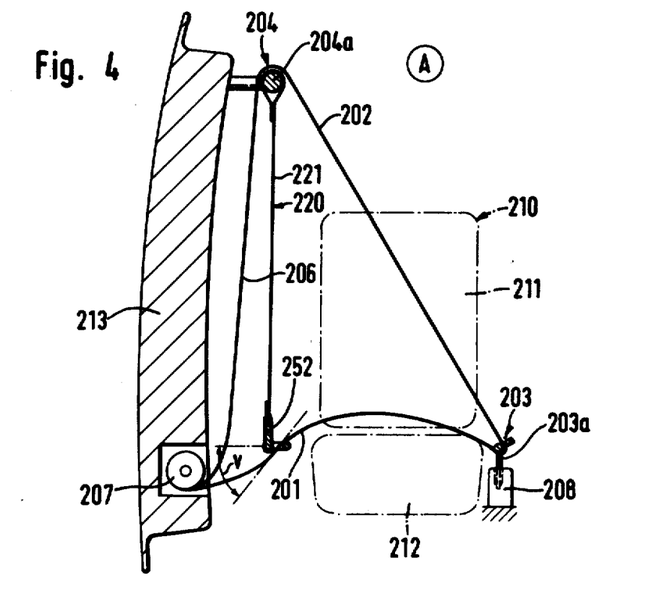
Figure 5:
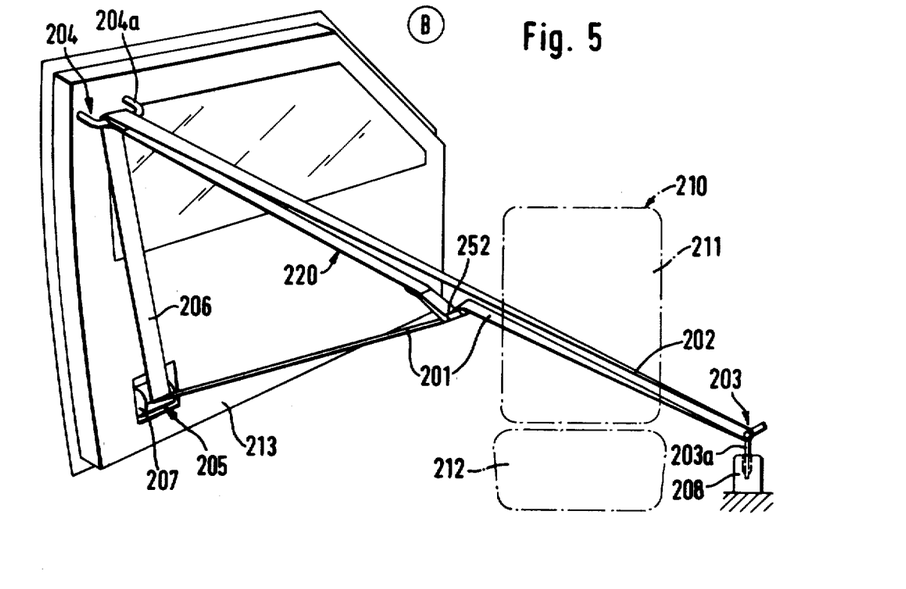

In FIG. 2 the safety belt is shown in its condition of non-use and suspended on the door 213, the coupling element 203a being uncoupled for the active utilization of the belt. In FIG. 3 the safety belt is shown in an intermediate position being subjected to an active pulling out operation in order to effect a coupling together of the coupling element 203a with the fitting 208, so that a functioning condition will be brought about. The upper and the lower belt portions 202 and 201 respectively are then prolonged in order to obtain the required lengths for the functioning condition. In FIG. 4 the belt is shown in its functioning condition with the door closed. In FIG. 5 the safety belt is shown for its passive utilization and with the door opened up, the winding up reel 207 having let out a major portion of the belt portions that can be wound up on the same.

The device according to this second embodiment comprises further a lifting means 220 via the deflecting shackle 204a and the additional portion 206 coupled between on one side the door 213 and on the other side the lower portion 201, which lifting means 220, when the door is opened, is arranged to lift up the lower portion 201. The lifting means 220 exhibits a shackle means or gripping means 252 between the lower portion 201 and the additional portion 206, which gripping means 252 will be described more in detail with reference to FIGS. 6 and 7. The gripping means 252 is movably coupled to the lower portion 201 as well as the additional portion 206. The lifting means 220 is designed in such a manner that at least its lower portion is substantially movable in the plane, in which the portions 1 and 2 of the belt are located, as is evident from the FIGS. 4 and 5.

In the illustrated embodiment the lifting means 220 exhibits a flexible strap 221 of long extension, which at one of its ends is fastened to the door 213 and connecting to the other point of support 204, the strap at the side of the same facing away from the lower portion 201 being laid round the same shackle 204 as the upper belt portion 202, but below the latter one in order to serve as a friction reducing means. At the other end of the strap 221 there is a fitting in the form of a gripping means 252, which is arranged to cooperate with the lower belt portion 201 in such a manner that under influence of the friction it catches hold of the lower belt portion 201, when the door is opened, but substantially permits a free movement through the same for the lower belt portion, when the door is closed.

Figure 6A:
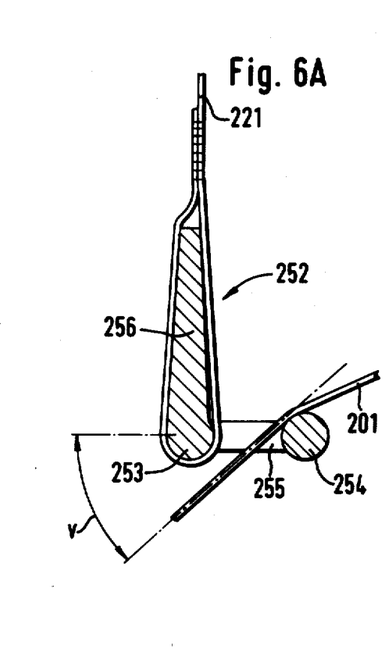
Figure 6B:
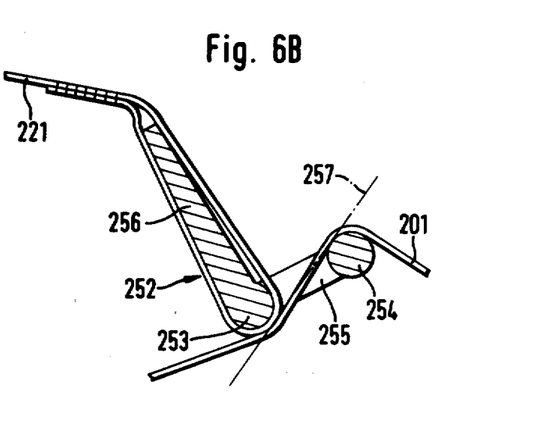

An especially preferred embodiment of the gripping means 252 is illustrated in a cross-sectional view in FIGS. 6A and 6B, for one thing in the position according to FIG. 4, where the lower belt portion 201 is relatively loosely supported, and for another thing in the position according to FIG. 5, where the gripping means 252 exhibits two laterally positioned deflecting elements 253 and 254, which in between them form an opening 255, through which the lower belt portion 201 is extending. In the illustrated embodiment the deflecting element comprises substantially cylindrically shaped elements, which at their ends are connected by means of a yoke. However, the deflecting elements can exhibit also other shapes.

An essentially stiff lever arm 256 is rigidly connected with the deflecting elements 253, 254, and the flexible strap of the lifting means 221 is at a connecting point coupled to the free end of the arm 256. In the illustrated embodiment the strap is laid along the arm 256 below the deflecting element 253 and extends for a certain length in backwards direction, where it is sewed. The lever arm 256 can also be prolonged and comprise said element of long extension, the whole long lifting means being made of stiff or semi-stiff material.

FIG. 5 shows the safety belt according to FIG. 4, when the door 213 has been opened. The lower portion 201 and the upper portion 204 are then prolonged, the necessary prolonged portions having been obtained by unwinding from the reel 207.

It is evident from FIG. 5 that the lifting means 220 in connection with an activation will lift the lower belt portion 201 above the vehicle seat surface 212. The length of the lifting means 220 is adjusted in such a way that a suitable distance between the lower portion 201 and the seating surface 212 is obtained in order to facilitate getting in and getting out of the vehicle.

When the door 213 has been opened, the gripping means 252 at the upper end of the lever arm 256 will be subjected to a pulling force in an oblique outwards direction, which results in such an angular position of the gripping means that the deflection elements 253 and 254 engage the lower belt portion 201 and will serve the purpose of taking up means. (FIG. 6B). In connection with an activation of the lifting means 220 the gripping means 252 will thus be pivoted in such a way that the deflection elements 253, 254 will abut against the lower belt portion 201, which in the opening 255 will extend along a common tangent plane 257 (FIG. 6B) of the deflection elements, said tangent plane forming an angle to the extension of the lever arm 256. In connection with the activation of the lifting means 220 the gripping means 252 will thus be pivoted in such a manner that the angle between said tangent plane and a vertical plane decreases. When the door 213 is opened, the third supporting point will be moved in outwards direction at the same time as the gripping means 252 is pivoted, whereby an angle v (FIGS. 4, 6A) to the horizontal plane for the extension of the lower belt portion in connection to the seating surface of the vehicle will decrease, which increases the gripping force between the gripping means and the lower belt portion. By this arrangement the lower belt portion 201 will be lifted, when the lifting means 220 in connection with a swinging out movement of the door 213 is pulled downwards. As the door is opening up, the grip will increase until the gripping means reaches the maximum lifting height for the lower belt portion as illustrated in FIG. 5.

The lifting means 220 exhibits such a length that the gripping means occupies a position level to the winding up reel, when the door is closed.

When the door is shut, the gripping means 252 will gradually swing backwards to its starting position shown in FIG. 6A, in which the lower belt portion can slide through the opening 255 of the gripping means.

The distance between the deflecting elements 253, 254 of the gripping means and the curved portion of the deflection elements is in a suitable manner adjusted, in such a way that a correct friction and idling respectively will be obtained with respect to the lower belt portion. Even if the lever arm 256 in the FIGS. 6A and 6B is shown with a special angle to said tangent plane 257, it should be understood that this angle is not of a critical nature, as it can be greater as well as smaller than 90°, all in dependence upon the distance between the deflecting elements and their design.

In order to quite clearly show a user that the lower portion has occupied its maximum lifting height and in this position secures a good take-up for the gripping means, means can be provided on a predetermined portion of the lower portion between the points of support 203 and 205 serving the purpose to increase the gripping effect of the gripping means 252. Said means can comprise a friction means with a course surface attached to one or to both sides of the lower portion or possibly a stiffening element, it also being possible to arrange that the belt for some distance of the same is treated in such a manner that a stiffening effect or increased friction is obtained.

The gripping means in addition to its fundamental gripping function, when the door is opened, also serves the purpose to facilitate the return pull of the lower belt portion to the winding-up reel 207. Because of the fact that the gripping means is quite heavy, it will stretch the strap portion of the lower belt portion between the point of support 203 and the gripping means 252, when the door is shut and also slack the lower belt portion close to the door, whereby the lower belt portion is kept down in connection to the winding-up reel, so that a winding-up operation will be facilitated. By means of this arrangement the winding-up reel can be provided with a not so strong spring for the return pull for the winding-up operation, which in its turn signifies that the vehicle door will not need to be equipped with such a strong door-stop in order to impede that the door is pulled in by the safety belt.

Even if the portion of the lifting means that supports the gripping means 252 can be made of the same flexible strap material as the belt itself, this portion can be made of another kind of material, as it does not fulfil any safety function but only serves the purpose to facilitate the getting in and getting out of the vehicle, making this more comfortable. Thus, said portion can be made of a substantially thinner strap or of a strap of leather or synthetic material or even of a thread. Said portion of the lifting means needs moreover not to be flexible but can be more or less stiff. The whole element of long extension, which is pivotably supported at its end facing away from the lower portion, can, thus, be designed as a more or less stiff lever arm.

Figure 7:
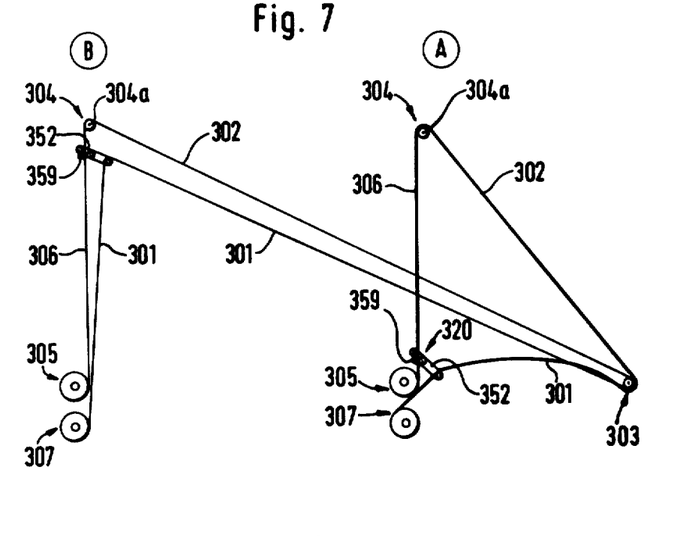

The third embodiment of the device according to the invention is illustrated in FIG. 7, the safety belt being shown in the above mentioned two conditions A and B. This embodiment makes likewise possible a greater lifting height for the lower portion, when the vehicle door is opened.

As in the previous embodiments the safety belt of FIG. 7 is mounted on a vehicle seat with back support and a seating surface and on a door, not shown.

The safety belt of FIG. 7 just as in the previous embodiments comprises an upper portion 302, a lower portion 301, an additional portion 306 and three points of support 303, 304, 305 of the same kind as the previous ones. As was the case in the second embodiment, the end of the additional portion 306 extends from the second point of support 304 to the third point of support 305, where it is coupled to the device for the return pull 307.

The device further comprises a lifting means 320, which via the deflection shackle 304a and the additional portion 306 is coupled between on one side the door and on the other side the lower portion 301, said lifting means 320 being arranged to lift up the lower portion, when the door is opened. Between the lower portion 301 and the additional portion 306 the lifting means 320 is provided with a shackle or gripping means 352, which is described more in detail below with reference to the FIGS. 9 and 10. The gripping means is movably coupled together with the lower portion 301 as well as the additional portion 306. A stop or similar carrier means 359 is provided on the additional portion 306 below the gripping means, which carrier means in connection with actuation of the lifting means, i.e. when the vehicle door is opened, is arranged to be abutted against the gripping means 352 and carry the same in the direction of the upwards movement of the additional portion, whereby the lower portion is lifted up. The stop 359 is described more in detail below with reference to the FIGS. 9 and 10, but it can be mentioned here that each type of carrier means, which in cooperation with the gripping means 352 carries the same along, can be utilized. Thus, a carrier means 359 can comprise a hole in the additional portion 306 for cooperation with a pin of the gripping means 352.

In connection with the lifting-up of the lower portion 301 this latter one slides on a deflecting element of the gripping means 352. The longitudinal extension of the gripping means across the belt portions is comparatively small, and therefore the lower portion 301 in the condition B will extend almost parallel to the additional portion from the gripping means towards the return pulling means, as is evident from FIG. 7. By this arrangement a great lifting height of the lower portion is obtained already when the vehicle door is opened at a moderate angle. When the vehicle door is closed, the strap portions pulled out by the return pulling means will be pulled back, whereby the stop 359 will be lowered down into the position illustrated in the condition A. At the same time the gripping means 352 is moved downwards under the influence of a pulling force exerted by the lower portion. The stop 359 exhibits a short extension in the crosswise direction of the belt strap, and if so desired, it can be mounted in such a manner that it can be pulled in into the return pulling means 307. For clarity's sake the stop 359 is in FIG. 7 shown outside of the return pulling means 307, when the safety belt occupies its A-position.

The return pulling means 307 preferably comprises a winding-up reel mounted on the vehicle door, as is schematically shown at the lower point of support 305. The winding-up reel can be of conventional type with a winding-up shaft that is arranged to act on the lower portion 301 as well as on the additional portion 306, which by this arrangement will be wound up in a parallel arrangement on the winding-up shaft. However, it is preferred to provide the winding-up reel with two juxtapositioned winding-up shafts, one acting upon the lower portion 301 and another acting upon the additional portion 306. The winding-up reel can then be designed with one or several elements in common. When the winding-up reel is provided with two winding-up shafts, the belt portions 301 and 302 can at the supporting point 303 be arranged to be unaffected by each other, i.e. they can be fixed, by which arrangement it is secured that the stop 359 will not be displaced in relation to its determined range of operation along the additional portion, when the safety belt is subjected to repeated use. The upper portion and the lower portion can then be attached to separate fastening points, by way of example one on the vehicle seat and the other on the side of the vehicle seat. Thus, although in this case there are four points of support, the safety belt is anyhow in practice still of the three-point type.

Figure 8:
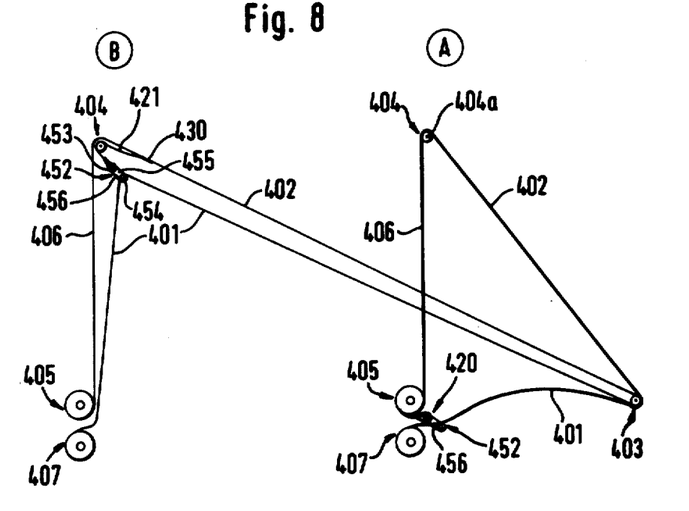

A fourth embodiment of the device according to the invention is illustrated in FIG. 8. Apart from the design of the lifting means this embodiment is identical to the device illustrated in FIG. 7. In the embodiment according to FIG. 8 the lifting means 420 is provided with a connecting element 421 of long extension, preferably in the form of a belt strap of the same type as the lower portion 401 and the upper portion 402. At one of its ends the element 421 is in suitable manner fastened to the additional portion 406 as for example to the point 430. At the other end of the element 421 there is a fitting in the form of a shackle or gripping means 452, which is shown in a cross-sectional view and is arranged to cooperate with the lower portion 401 in such a manner that when possibly subjected to some friction it grips around and deflects the direction of the lower belt portion 401, when the door is opened, and then permits a substantially free movement for the lower portion, when the door is closed.

The shackle or gripping means 452 can be designed in a great number of ways. A preferred simple design is shown in FIG. 8, where the gripping means 452 comprises two transverse elements 453, 454, which are mounted between two lateral pieces 455 (only one of them shown). The long element 421 is attached to the transverse element 453. An opening 456 is formed between the transverse elements, through which opening the lower portion is threaded in order to make possible that the gripping means in a sliding movement is displaced along the lower portion and thereby is deflected, when the lifting means is actuated, i.e. when the door is opened or closed. The transverse elements are shown with a circular cross-section, but if so desired, they can exhibit another cross-section. The opening 456 between the transverse elements is of suitable size and can be designed in such a manner that in cooperation with the lower portion a desired friction effect can be obtained, when the gripping means is displaced along the lower portion, whereby a desired curve of movement for the gripping means can be obtained, when the door is opened. Additional designs of the gripping means 452 and especially its portion coupled to the lower portion 401 is described below.

The connecting element 421 can exhibit several different designs and as it does not have any safety function, when the safety belt is used, it can be thinner than the belt strap itself. However, it is preferred that the element 421 is designed as a loop of the belt strap of the additional portion laid round the transverse element 453 through the gripping means 452, which loop can be fastened to 430 by way of example by being sewed.

It is not necessary that the element 421 is flexible and it can therefore be made of a stiff or semi-stiff material. However, the element 421 should be designed in such a manner that in the A-condition it permits being pulled in into the return pulling means 407, as is shown in FIG. 8.

As is evident from FIG. 8 the lifting means 452 will become active when the vehicle door is opened. The lower portion 401 and the upper portion 402 are then prolonged, the return pulling means 407 letting out belt strap therefore. When the additional portion 406 is pulled upwards, the fastening point 430 of the element 421 will be displaced in upwards direction, whereby the gripping means 452 lifts up the lower portion 401 above the seating surface of the vehicle seat. When the door is completely open, the connecting element 421 will at least partly have been pulled round the deflecting shackle 404a, as is shown in the condition B. By means of a suitable selection of the length of the element 421 and the position of the fastening point 430 a desired lifting height is obtained for the lower portion.

The gripping means 352 of the embodiment according to FIG. 7 can exhibit different designs. Two preferred designs are illustrated in FIGS. 9 and 10 in cross-section, and in these designs the portion cooperating with the lower portion can form part of the gripping means of the embodiment in FIG. 2.

Figure 9:
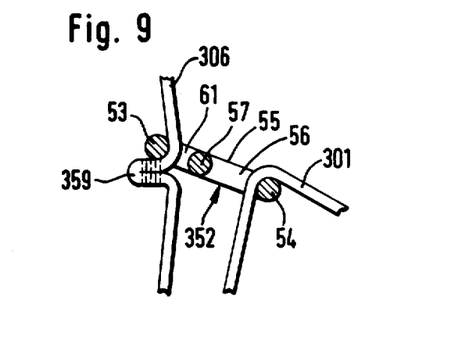

The gripping means in FIG. 9 comprises transverse elements 53, 54 and 57 arranged between two lateral pieces 55 (only one shown), which transverse elements can be of the same design as corresponding transverse elements of the gripping means according to FIG. 7. An opening 56 is formed between the transverse elements 54 and 57, through which opening the lower portion 301 is extending. The same conditions are applicable to this opening 56 as to the corresponding opening of the gripping means according to FIG. 8. An opening 61 is formed between the transverse elements 53 and 57, through which opening the additional portion 306 is extending. The opening 61 is dimensioned in such a manner that the additional portion 306 easily is running through the same, but the stop or the carrier means 359 cannot pass through said opening. The stop of the preferred design in the form of a doubled up portion of the additional portion 306 is shown in FIGS. 9 and 10, said doubled up portion being sewed, as is schematically shown in the figures. As already mentioned, the carrier means 359 can comprise any type of means of suitable form, also a separate means fastened to the additional portion 306 and adapted to cooperate with the gripping means 352.

Figure 10:
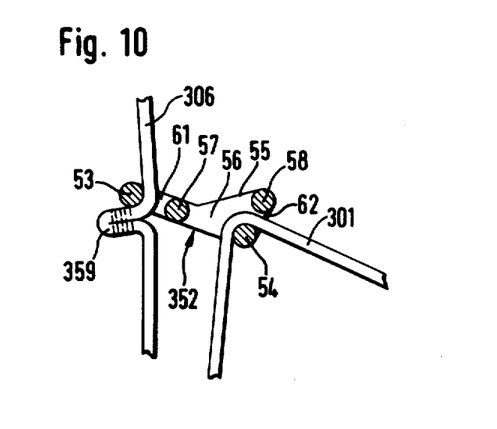

The design of the gripping means 352 illustrated in FIG. 10 in addition to the elements shown in FIG. 9 exhibits an additional transverse element 58, which together with the transverse element 54 forms an opening 62, through which the lower portion 301 is extending. The transverse element 58 is arranged to increase the friction against the lower portion 301, when the lifting means is activated. In the portions of the gripping means, which cooperates with the lower portion as well as with the additional portion can exhibit more deflecting elements than the ones shown here, which can be distributed in between them in other manners, not shown. The lower portion and also the upper portion can along some portion be coated with a friction increasing material in order to increase the friction between the respective portion and the deflecting transverse elements of the gripping means.

With respect to the embodiments according to FIGS. 7 and 8 the mounting of the belt strap to the point of support 303 and 403 respectively has not been described in detail. Apart from what has previously been mentioned with respect to this point of support, the lower portion 301 and 401 respectively and the upper portion 302 and 402 respectively can here be arranged in a great many manners. Thus, the design according to FIG. 1 is possible, where the belt is supported in a movable fashion, but when a winding-up reel with two winding-up shafts is utilized, it is preferred to let the lower portion and the upper portion be fastened in such a manner that they cannot affect each other.

According to an embodiment of the device according to the invention, which is not shown in the drawings, the lifting means 120, 220, 320, 420 at its side facing away from the lower belt portion 101, 201, 301, 401 can be mounted on another suitable point separated from the second point of support 104, 204, 304, 404. Thus, the lifting means can be separately attached to the door, if this is considered to be suitable.

According to still another embodiment of the device according to the invention, which is not shown, the end of the lower portion and possibly also of the additional portion leading to the winding-up reel or reels can be deflected, before it enters into the reel, whereby the reel can be arranged at a distance from this deflection point, by way of example higher up on the door side etc., by which arrangement a better protection of the reel against damage can be obtained.

The invention is not limited to the embodiments described above and illustrated in the drawings, but can be varied within the scope of the following claims.

I claim:

1. A safety belt mounted adjacent a vehicle seat for holding a user occupying said seat, said safety belt comprising a lower portion to extend over the hip portions of the user, an upper portion to extend in diagonal direction across the chest of the user from one of the hip portions to a shoulder portion, and an additional portion as a prolongation of the upper portion, the lower portion and the upper portion extending from one side of a lower portion of the vehicle seat in divergent fashion to a lower and an upper point of support respectively of a vehicle door located on the other side of the vehicle seat, the additional portion extending from the upper point of support to the lower portion of the belt, at least one return pulling means occupying a position at the lower point of support of the vehicle door, the lower portion of the belt and the additional portion of the belt being coupled to said at least one return pulling means for a return pull actuation, and lifting means for lifting up said lower belt portion upon opening the vehicle door.

2. A safety belt according to claim 1, wherein said lifting means comprises at least one portion of said additional belt portion.

3. A safety belt according to claim 1, wherein said lifting means comprises a long element having an end facing the lower belt portion, and gripping means at said end for cooperation with the lower belt portion, when the door is opened up.

4. A safety belt according to claim 3, wherein said gripping means comprises two deflecting elements mounted at a certain distance from each other and having an opening formed between them through which the lower belt portion runs, said deflecting elements being arranged to serve as taking-up means for the lower belt portion when said lifting means is actuated.

5. A safety belt according to claim 4, wherein said lower belt portion passes below the one of said deflecting elements located nearest to the door of the vehicle through the opening thereof and above the other deflecting element in order to extend along a tangent plane between the deflecting elements, upon actuation of said lifting means, and said gripping means having a lever arm connected with said deflecting elements, said lever arm at a connecting point being connected with said long element, said lever arm being arranged to pivot said gripping means when said lifting means is actuated, so that the angle between said tangent plane and a vertical plane increases.

6. A safety belt according to claim 2 or 3, wherein said lifting means comprises a gripping means coupled between the additional portion and the lower portion of the belt and displaceable along said lower portion of the belt, said gripping means having at least one deflecting element for the deflection of the lower portion of the belt.

7. A safety belt according to claim 6, wherein said gripping means is displaceably coupled together with the additional portion of the belt, and carrier means provided on the additional portion of the belt in order to lift said gripping means in upwards direction, while the additional portion is pulled out from the return pulling means when the vehicle door is opened.

8. A safety belt according to any one of claims 1 to 5, wherein said lifting means is coupled at its side facing away from the lower belt portion to the belt or to the vehicle door in order to be actuated, when the door is opened.

9. A safety belt according to any one of claims 1 to 5, wherein said return pulling means comprising two winding-up shafts respectively cooperating with the lower portion of the belt and with the additional portion of the belt, and the lower portion of the belt and the upper portion of the belt at the side of the vehicle seat facing away from the door being arranged so as not to affect each other.

* * * * *